(12) United States Patent
Kline

(10) Patent No.: US 9,081,392 B2
(45) Date of Patent: Jul. 14, 2015

(54) MIXING VALVE

(71) Applicant: Magarl, LLC, Naples, FL (US)

(72) Inventor: Kevin B. Kline, Whitefish Bay, WI (US)

(73) Assignee: MAGARL, LLC, Naples, FL (US)

( * ) Notice: Subject to any disclaimer, the term of this patent is extended or adjusted under 35 U.S.C. 154(b) by 0 days.

(21) Appl. No.: 14/040,115

(22) Filed: Sep. 27, 2013

(65) Prior Publication Data

US 2014/0102550 A1    Apr. 17, 2014

Related U.S. Application Data

(60) Continuation of application No. 13/403,593, filed on Feb. 23, 2012, now Pat. No. 8,544,760, which is a continuation of application No. 12/762,942, filed on Apr. 19, 2010, now Pat. No. 8,123,140, which is a (Continued)

(51) Int. Cl.
*G05D 23/13* (2006.01)
*F16K 15/02* (2006.01)

(52) U.S. Cl.
CPC ............ *G05D 23/134* (2013.01); *F16K 15/025* (2013.01)

(58) Field of Classification Search
CPC . G05D 23/13; G05D 23/1306; G05D 23/132; G05D 23/134
USPC .......... 236/12.11, 12.16, 12.17, 12.18, 12.19, 236/12.2, 12.21
See application file for complete search history.

(56) References Cited

U.S. PATENT DOCUMENTS

| 2,911,153 | A | 11/1959 | Pett |
| 3,124,304 | A | 3/1964 | Stuhl |
| 3,388,861 | A | 6/1968 | Harding |
| 3,685,728 | A | 8/1972 | Chapou |
| 3,827,016 | A | 7/1974 | Knapp |
| 3,929,283 | A | 12/1975 | Delpla |
| 3,938,741 | A | 2/1976 | Allison |

(Continued)

FOREIGN PATENT DOCUMENTS

| EP | 0775954 | 5/1997 |
| EP | 1244948 | 2/2005 |

(Continued)

OTHER PUBLICATIONS

Symmons Industries product information for Symmons TempControl, 2 pgs, copyright 2011.

(Continued)

*Primary Examiner* — Marc Norman
(74) *Attorney, Agent, or Firm* — John V. Daniluck; Bingham Greenebaum Doll LLP

(57) ABSTRACT

A mixing valve (10) includes a valve body (12) having a hot fluid inlet (14), a cold fluid inlet (16), a mixed fluid outlet (18), and a cavity (20) in the valve body (12) between the inlets (14, 16) and the outlet (18). Mixing valve (10) includes a liner (30, 130, 230, 430, 530, 630, 730, 830) positioned in valve body (12) and a valve member (40, 140, 240, 340, 440, 540, 640, 740, 840) movable therein between a first position restricting the flow of hot fluid and a second position. Liner (30, 130, 230, 430, 530, 630, 730, 830) includes a downstream valve seat (74, 174, 274, 474, 574, 674, 774) that, when engaged by valve member (40, 140, 240, 340, 440, 540, 640, 740, 840), restricts flow of hot fluid past valve member (40, 140, 240, 340, 440, 540, 640, 740, 840).

8 Claims, 8 Drawing Sheets

Related U.S. Application Data division of application No. 10/783,502, filed on Feb. 20, 2004, now Pat. No. 7,717,351, which is a continuation of application No. PCT/US02/27056, filed on Aug. 23, 2002.

(60) Provisional application No. 60/314,803, filed on Aug. 24, 2001.

(56) References Cited

U.S. PATENT DOCUMENTS

| | | | |
|---|---|---|---|
| 4,082,219 | A | 4/1978 | Rogers, Jr. et al. |
| 4,509,677 | A | 4/1985 | Bendall |
| 4,607,788 | A | 8/1986 | Bendall et al. |
| 5,011,074 | A | 4/1991 | Kline |
| 5,033,671 | A | 7/1991 | Shiba et al. |
| 5,174,496 | A | 12/1992 | Bourgin |
| 5,203,496 | A | 4/1993 | Kline |
| 5,323,960 | A | 6/1994 | Kline |
| 5,356,074 | A | 10/1994 | Limet et al. |
| 5,379,936 | A | 1/1995 | Kline |
| 5,535,943 | A | 7/1996 | Kahle et al. |
| 5,647,531 | A | 7/1997 | Kline et al. |
| 5,806,761 | A | 9/1998 | Enoki et al. |
| 5,971,285 | A | 10/1999 | Knapp |
| 6,079,625 | A | 6/2000 | Lubkuchner |
| 6,250,559 | B1 | 6/2001 | Knauss |
| 6,257,493 | B1 | 7/2001 | Chamot et al. |
| 6,279,831 | B1 | 8/2001 | Lorch |
| 6,315,210 | B1 | 11/2001 | Kline |
| 6,328,219 | B1 | 12/2001 | Taylor et al. |
| 6,405,932 | B1 | 6/2002 | Palmer |
| 6,543,478 | B2 | 4/2003 | Kline |
| 6,575,377 | B1 | 6/2003 | Graves |
| 6,726,110 | B2 | 4/2004 | Heinzelmann |
| 6,851,440 | B2 | 2/2005 | Kline |
| 6,926,205 | B2 | 8/2005 | Taylor et al. |
| 6,929,188 | B2 | 8/2005 | Taylor et al. |
| 6,994,266 | B2 | 2/2006 | Sadling |
| 7,140,394 | B2 | 11/2006 | Eveleigh |
| 7,163,157 | B2 | 1/2007 | Goncze et al. |
| 7,191,954 | B2 | 3/2007 | Kline |
| 7,240,850 | B2 | 7/2007 | Beck et al. |
| 7,448,553 | B2 | 11/2008 | Schmitt |
| 7,475,827 | B2 | 1/2009 | Schmitt |
| 7,665,671 | B2 | 2/2010 | Cunningham et al. |
| 7,673,808 | B2 | 3/2010 | Mace et al. |
| 7,717,351 | B2 | 5/2010 | Kline |
| 7,740,183 | B2 | 6/2010 | Knapp |
| 7,744,007 | B2 | 6/2010 | Beagen et al. |
| 7,770,807 | B2 | 8/2010 | Robinson et al. |
| 7,850,088 | B2 | 12/2010 | Wei et al. |
| 7,874,498 | B2 | 1/2011 | Kempf |
| 7,913,926 | B2 | 3/2011 | Goncze |
| 2004/0084541 | A1 | 5/2004 | Eveleigh |
| 2007/0246549 | A1 | 10/2007 | Kline |
| 2009/0314844 | A1 | 12/2009 | Mace |
| 2010/0123014 | A1 | 5/2010 | Beagen |
| 2010/0147963 | A1 | 6/2010 | Goncze |
| 2010/0219255 | A1 | 9/2010 | Sansum et al. |

FOREIGN PATENT DOCUMENTS

| | | |
|---|---|---|
| GB | 2460878 | 12/2009 |
| WO | 9732147 | 9/1997 |
| WO | 2004068252 | 8/2004 |
| WO | 2010028790 | 3/2010 |

OTHER PUBLICATIONS

Symmons Industries Installation, Operation, and Service Instruction for Symmons TepControl, 4 pgs, copyright 2011.
PCT/US02/27056, International Search Report mailed Dec. 10, 2002, 4 pgs.
PCT/US02/27056, International Preliminary Examination Report mailed Sep. 27, 2004, 4 pgs.
U.S. Appl. No. 10/783,502, NF OA mailed Mar. 23, 2009, 7 pgs.
Applicant Response, U.S. Appl. No. 10/783,502, filed Oct. 22, 2009, 21 pgs.
U.S. Appl. No. 10/783,502, Notice of Allowance mailed Jan. 11, 2010, 7 pgs.
U.S. Appl. No. 12/762,942, Notice of Allowance mailed Oct. 25, 2011, 6 pgs.
U.S. Appl. No. 13/403,593, NF OA mailed Nov. 29, 2012, 6 pgs.
Applicant Response, U.S. Appl. No. 13/403,593, filed Apr. 29, 2013 and May 6, 2013, 23 pgs.
U.S. Appl. No. 13/403,593, Notice of Allowance mailed Jun. 11, 2013, 7 pgs.

US 9,081,392 B2

MIXING VALVE

CROSS-REFERENCE TO RELATED APPLICATION

This application is a continuation of U.S. patent application Ser. No. 13/403,593, filed on Feb. 23, 2012, now issued as U.S. Pat. No. 8,544,760; which is a continuation of U.S. patent application Ser. No. 12/762,942, filed Apr. 19, 2010, now issued as U.S. Pat. No. 8,123,140, which is a divisional of U.S. patent application Ser. No. 10/783,502, filed Feb. 20, 2004, now issued as U.S. Pat. No. 7,717,351, which is a nationalization of and claims the benefit of PCT Application Number PCT/US02/27056 having International Publication Number WO 03/019315 A1, filed 23 Aug. 2002, which claims the benefit of U.S. Provisional Patent Application Ser. No. 60/314,803 filed 24 Aug. 2001.

FIELD OF THE INVENTION

This disclosure relates to mixing valves. More particularly, this disclosure relates to valves for mixing a first fluid with a second fluid.

BACKGROUND AND SUMMARY

Mixing valves having valve bodies configured to combine flows of hot and cold fluids to provide a controlled mixed fluid temperature are known. Examples of such mixing valves using thermostatic control are shown in U.S. Pat. Nos. 6,315,210, 5,647,531, 5,379,936, 5,323,960, 5,203,496, and 5,011,074, the disclosures of which are hereby expressly incorporated by reference herein, the applicant/inventor in the present application being an inventor in each of these patents.

A mixing valve includes a valve body having a hot fluid inlet, a cold fluid inlet, and a mixed fluid outlet. The valve body includes a cavity between the inlets and the outlet. In one embodiment, a first seat and a second seat are in the cavity, and a valve member in the cavity is movable between a first position engaging the first seat and a second position engaging the second seat.

In one aspect of the disclosure, a liner in the cavity includes the first and second seats. In another aspect of the disclosure, the valve member includes a weep opening to permit restricted flow of at least the hot fluid. In another aspect of the disclosure, the valve member includes a plurality of spaced apart mixing fins.

In another aspect of the disclosure the mixing valve includes a liner in the cavity, the liner including a hot liner inlet and a cold liner inlet. In one implementation of this aspect, the second seat is between the cold liner inlet and the first seat. In another implementation of this aspect, the cold liner inlet is between the first seat and the second seat. In another implementation of this aspect, the valve member is a poppet-style valve member and the hot liner inlet is a bore in a floor of the liner.

Additional features will become apparent to those skilled in the art upon consideration of the following detailed description of illustrative embodiments exemplifying the best mode of carrying out the drop leaf support apparatus as presently perceived.

BRIEF DESCRIPTION OF THE DRAWINGS

FIG. 3A illustrates a cross sectional view taken through a center of the liner and valve member showing the valve member in the first position engaging the first seat and spaced apart from the second seat;

FIG. 3B illustrates the liner and valve member of FIG. 3A spaced apart from the first and second seats, with sides of the valve member still blocking flow through the hot liner inlet;

FIG. 3C illustrates the liner and valve member of FIG. 3A positioned between the first and second seats and oriented to permit flow of hot and cold fluids through the hot and cold liner inlets;

FIG. 3D illustrates the liner and valve member of FIG. 3A in the second position engaging the second seat, and a disc at a downstream end of the valve member engaging the second seat, the disc formed to include a weep opening to permit restricted flow of the hot and cold fluids therethrough when the valve member engages the second seat;

DETAILED DESCRIPTION

Figure 1:
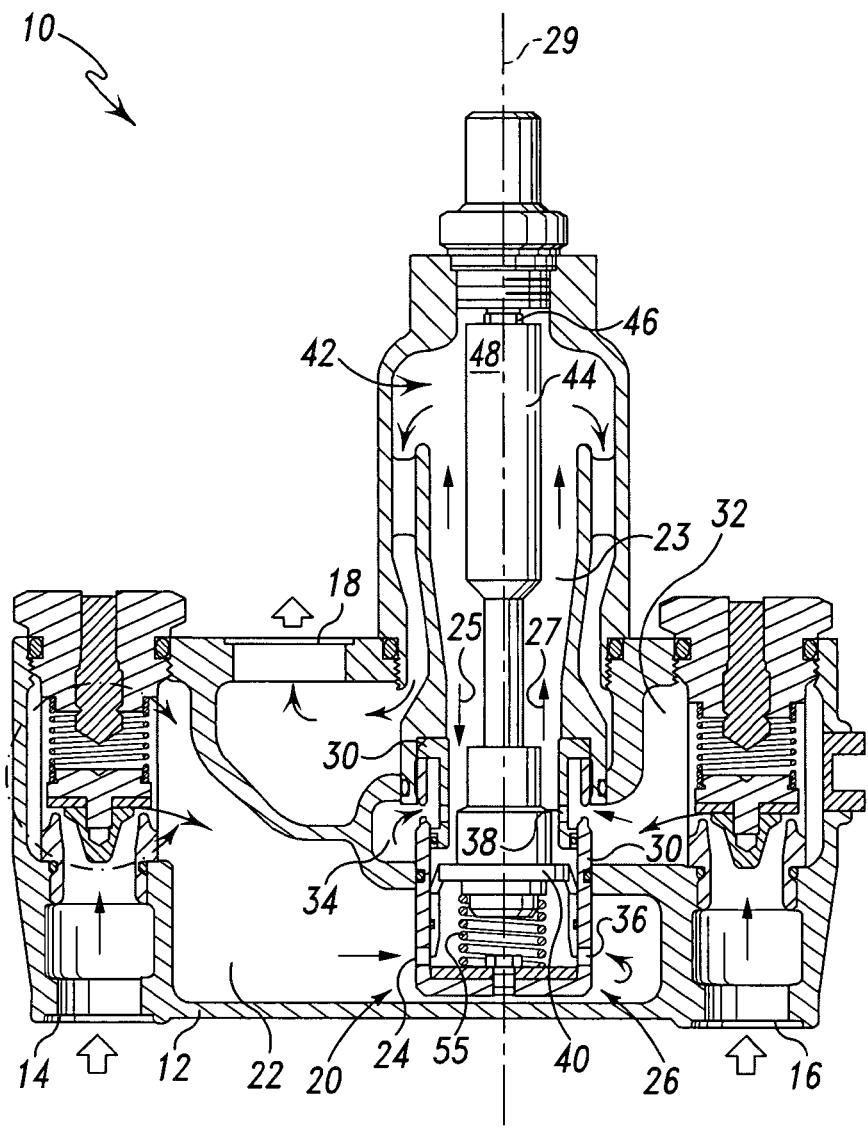
FIG. 1 illustrates a sectional view taken through a valve body of a thermostatic mixing valve to expose hot and cold fluid inlets and a mixed fluid outlet in communication with a liner in the valve body shown in section to reveal a valve member movable in the liner to restrict flow from the hot and cold liner inlets in response to movement of a thermostat assembly that senses the mixed fluid temperature.
Figure 2:
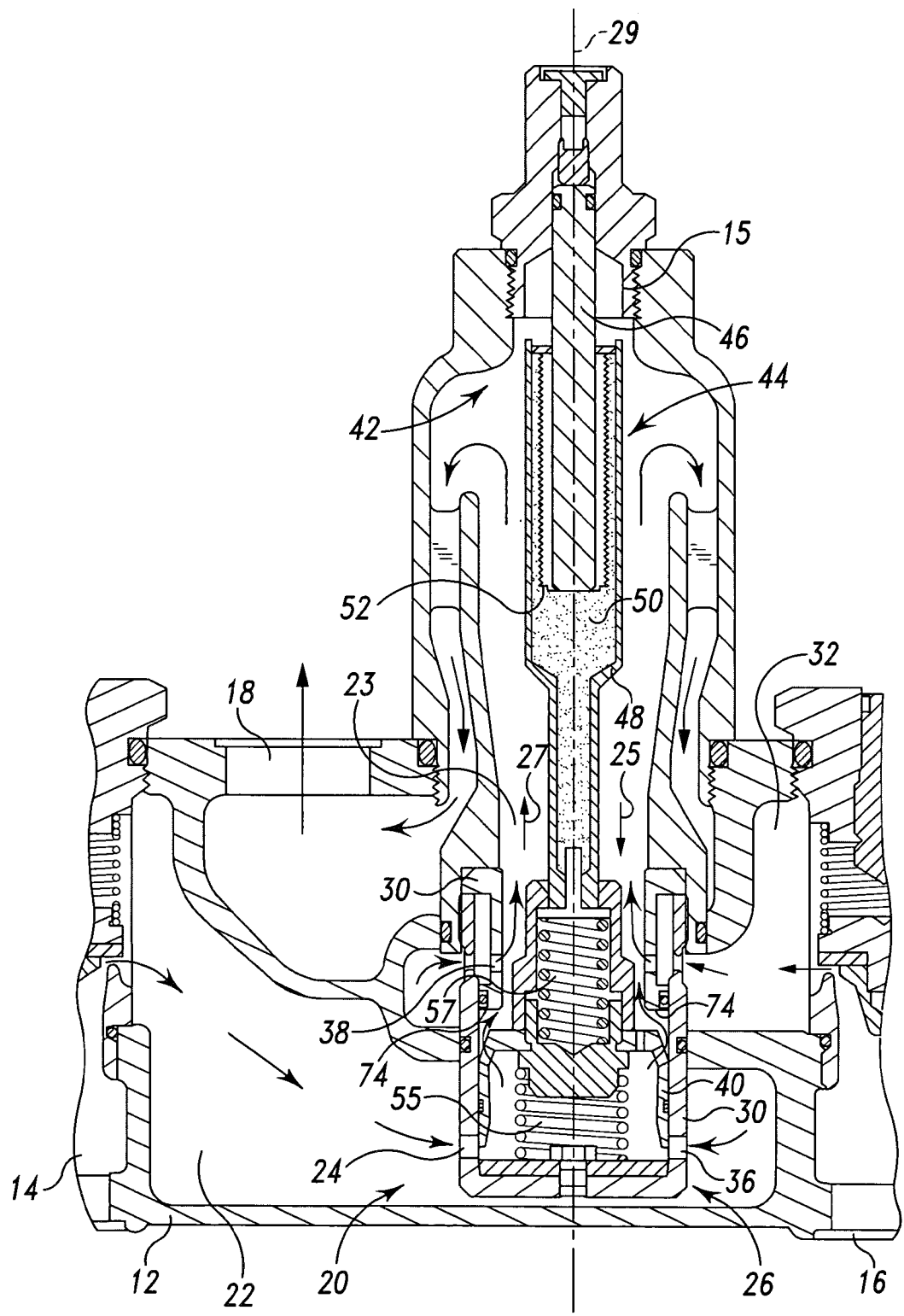
FIG. 2 illustrates a fragmentary sectional view similar to FIG. 1 showing the thermostat assembly in section to reveal a thermostat body, a bellows sealably coupled thereto, a thermally responsive fluid in the thermostat body, and an actuator coupled to the thermostat to cooperate with the valve member to move the valve member in the liner.

Referring now particularly to FIGS. 1 and 2, a mixing valve 10 includes a valve body 12 having a hot fluid inlet 14 coupled to a source of relatively hot fluid and a cold fluid inlet 16 coupled to a source of relatively cold fluid. Valve body 12 also includes a mixed fluid outlet 18 and a cavity 20 formed in valve body 12 between the mixed fluid outlet 18 and the hot and cold fluid inlets 14, 16. A hot fluid passageway 22 extends between hot fluid inlet 14 and a hot inlet port 24 to cavity 20. Hot inlet port 24 is adjacent a first end 26 of cavity 20. A cold fluid passageway 32 extends between cold fluid inlet 16 and a cold inlet port 34 to cavity 20. Cold inlet port 34 is positioned downstream relative to hot inlet port 24. Cavity 20 includes a mixing region or chamber 23 in which hot and cold fluids are mixed prior to exiting valve 10 through mixed fluid outlet 18.

As shown in FIGS. 1 and 2, a liner 30 is positioned in cavity 20. Liner 30 includes a hot liner inlet 36 in communication with the hot inlet port 24 and a cold liner inlet 38 in communication with the cold inlet port 34. Illustratively, liner 30 is cylindrical about a central axis 29 extending through liner 30. It is within the scope of this disclosure that liner 30 may comprise more than one piece, as shown in FIGS. 1 and 2.

Figure 13:
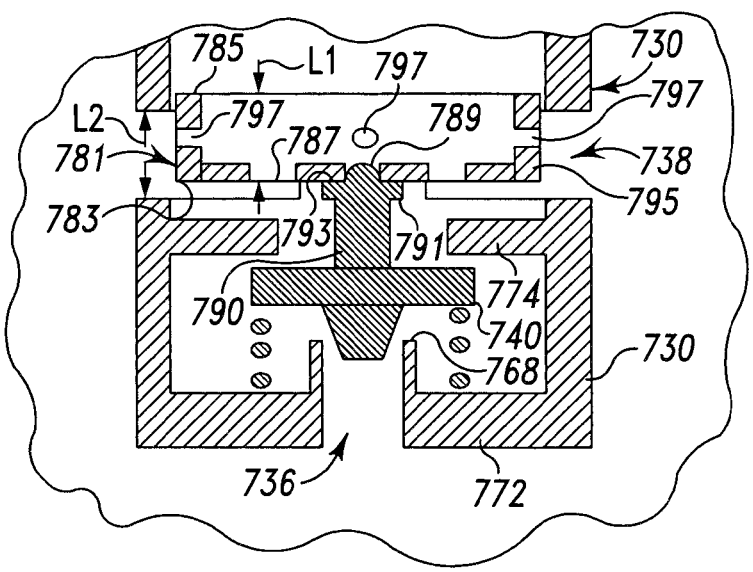
FIG. 13 illustrates a fragmentary sectional view of a portion of an alternative liner and valve member, the hot liner inlet being a bore and the valve member including a downstream portion engaging the bore to close the hot liner inlet when the valve member is in a first position, and a disc outside the liner when the valve is in the first position and engaging the bore to close the hot liner inlet when the valve member is in a second position.

As shown in FIGS. 1 and 2, a valve member 40 moves along axis 29 in liner 30 from a position permitting flow of hot fluid through the hot liner inlet to a position inhibiting flow of the hot fluid into mixing valve 10. Valve member 40 moves either in an axially upstream direction 25 or an axially downstream direction 27. It is within the scope of this disclosure that the valve member may comprise more than one piece, as shown in FIG. 13.

In thermostatic mixing valves, such as that shown in FIGS. 1 and 2, a thermostat assembly 42 cooperates with valve member 40 to move the valve member in response to changes in the mixed fluid temperature. As shown in FIG. 2, thermostat assembly 42 is positioned in valve body 12 and includes a thermostat 44 and an actuator or pushrod 46 coupled to thermostat 44. Thermostat 44 includes a thermostat body 48. A thermally responsive fluid 50 is held in a cavity 54 formed in thermostat body 48 by a bellows 52 sealed to the body 48. As the mixed fluid flows around and contacts thermostat 44, the volume of thermally responsive fluid 50 changes in response to changes in the mixed fluid temperature, moving bellows 52. As bellows 52 moves, bellows 52 moves actuator 46 relative to body 48 along central axis 29. It is understood that other types of thermostats, as are known in the art, may be used within the scope of this disclosure.

As shown in FIG. 2, a first spring 55 biases valve member 40 in a downstream direction 27 toward a second or downstream valve seat 74. A second or return spring 57 is operatively coupled to thermostat 44 and valve member 40. Return spring 57 cooperates with bellows 52 to limit travel of valve member 40 so that, under normal operating conditions, valve member 40 does not travel far enough downstream to seat against second seat 74. Upon failure of bellows 52, first spring 55 moves valve member 40 upstream and seats valve member 40 against second seat 74, preventing or reducing the flow of hot fluid into the mixing chamber 23.

Referring now to FIGS. 3A-3D, a liner 130 and valve member 140 moveable in liner 130 are shown. Liner 130 is generally cylindrical and has a bore 164 therethrough in which valve member 140 moves to open and close hot liner inlet 136 and inhibit flow of hot fluid into the mixing valve. Valve member 140 cooperates with liner 130 to inhibit hot fluid flow through hot liner inlet 136 when the mixed fluid temperature is too high. Valve member 140 also cooperates with liner 130 to inhibit flow of hot fluid past valve member 140 when the thermostat fails. As depicted in FIGS. 3A-3D, valve member 140 moves in liner 130 between a first position shown in FIG. 3A wherein the flow of hot fluid is restricted by valve member 140 covering hot liner inlet 136, and a second position shown in FIG. 3D wherein valve member 140 engages second seat 174 to restrict at least a majority of the flow of hot fluid.

Liner 130 includes an upstream region 166 having a first seat 168. Illustratively, a floor 172 of liner 130 provides first seat 168. However, other configurations are possible within the scope of this disclosure. Hot liner inlet 136 is shown in FIGS. 3A-3D as a slot formed in the side of liner 130. Cold liner inlet 138 is a slot formed in the side of liner 130 downstream of hot liner inlet 136. As shown in FIGS. 3A-3D, liner 130 includes second seat 174 downstream of first seat 168 and downstream of hot and cold liner inlets 136, 138. Second seat 174 is illustratively an annular flange 175 extending radially inwardly toward central axis 29. Illustratively, a wall 178 extends upstream from flange 175 toward valve member 140, providing a seating surface 180 against which valve member seats upon failure of the thermostat.

Valve member 140 includes a generally cylindrical portion 182 having a downstream end 184 and an upstream end 176. Upstream end 176 engages first seat 168 to close hot liner inlet 136. As valve member 140 moves toward engagement with first seat 168, cylindrical portion 182 covers hot liner inlet 136, restricting flow of hot fluid into valve body. Valve member 140 further includes a disc 188 coupled to downstream end 184 of cylindrical portion 182 with a connection member 190. Disc 186 includes an engagement surface 192 facing downstream to engage seating surface 180 of second seat 174.

Figure 3A:
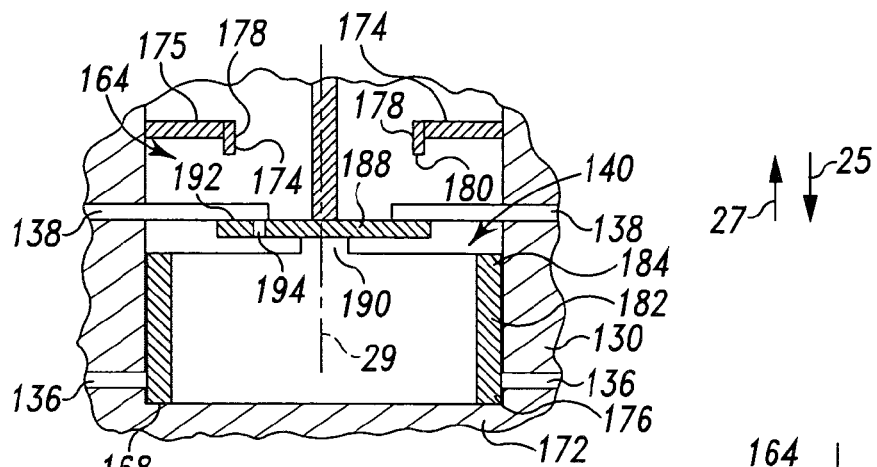
FIGS. 3A-3D illustrate a sequence in which a valve member moves in a liner having a hot liner inlet, a second seat, and a cold liner inlet between the second seat and the hot liner inlet, the valve member being movable between a first position engaging a first seat in the liner to close the hot liner inlet and a second position engaging a second seat to restrict flow of fluid from the hot liner inlet.
Figure 3B:
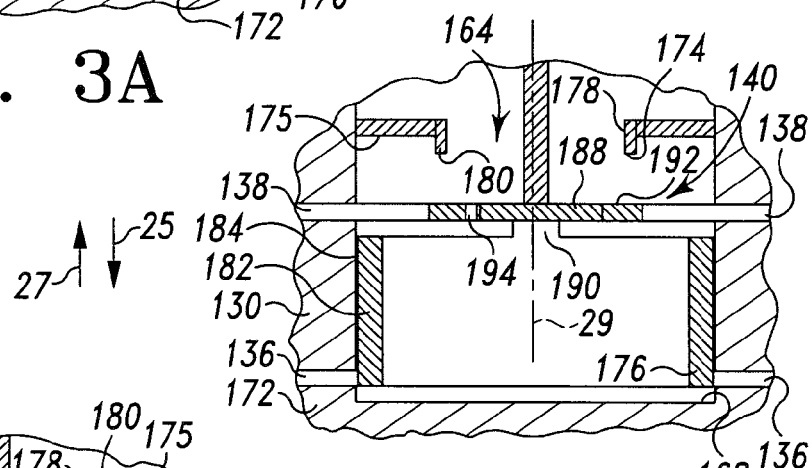
Figure 3C:
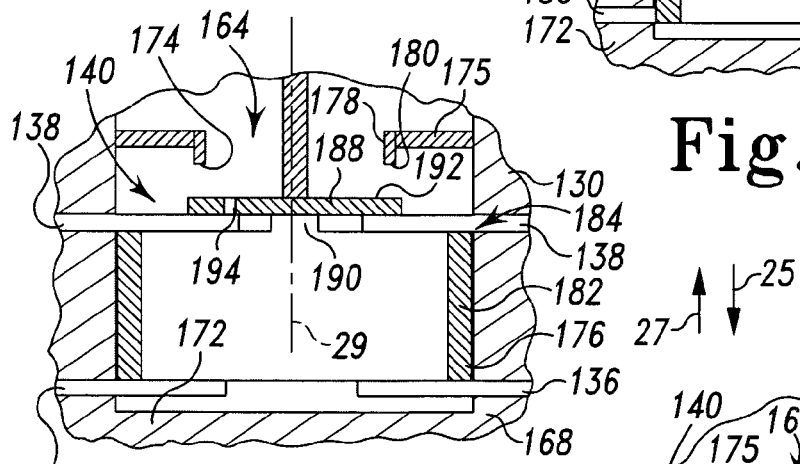
Figure 3D:
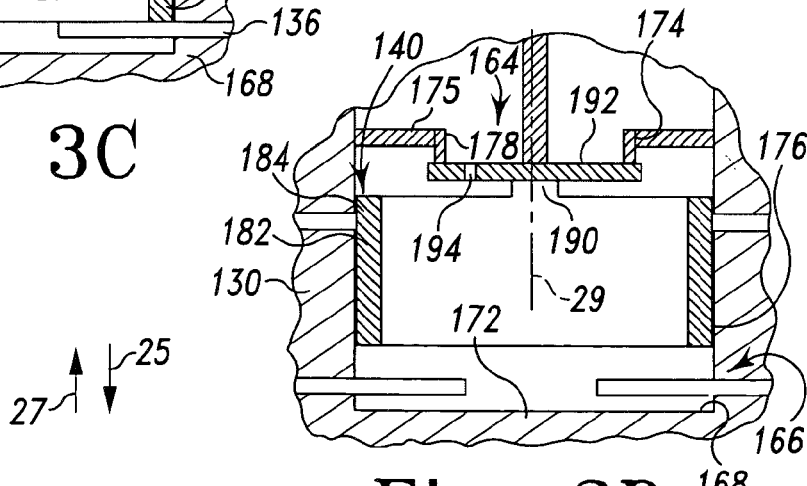

When the temperature of the mixed fluid increases, thermally responsive fluid 50 expands, moving valve member 140 in an upstream direction. As valve member 140 moves upstream, valve member 140 moves toward a first position shown in FIG. 3A in which hot liner inlet 136 is closed by engagement of upstream end 176 and first seat 168. As valve member 140 moves upstream, it covers increasing portions of hot liner inlet 136 until it closes the inlet 136. In the first position, valve member 140 closes hot liner inlet 136 and permits flow of cold fluid through cold liner inlet 138. As the temperature of mixed fluid decreases, thermally responsive fluid 50 contracts, and first spring (not shown) biases valve member 140 in downstream direction 27. Valve member 140 thus moves through a position such as that shown in FIG. 3B, to an intermediate or third position, such as the position shown in FIG. 3C, opening hot liner inlet 136 to permit hot fluid to flow therethrough. As shown in FIG. 3B, as valve member 140 moves in upstream direction 25, the sides of upstream end 176 of cylindrical portion 182 cover hot liner inlet 136 prior to engagement with first seat 168.

To prevent lock-up of valve 10, a weep opening Or port 194 may be formed in disc 186 as shown in FIGS. 3A-3D to permit a substantially restricted flow of fluid therethrough when valve member 140 engages second seat 174. In operation, if the source of relatively hotter fluid fails, and no hot fluid flows into valve body 12, thermostat assembly 42 may move an amount so that valve member 140 engages second seat 174. Without weep port 194 permitting restricted flow of fluid therethrough, upon return of hot fluid flow, valve 10 would remain in the position shown in FIG. 3D. By permitting restricted flow of fluid through weep port 194, the thermostat assembly 42 can respond to the return of hot fluid and can move valve member 140 from the position shown in FIG. 3D.

It is within the scope of this disclosure to provide a weep opening such as weep port 194 in a wide variety of valve configurations.

Figure 4:
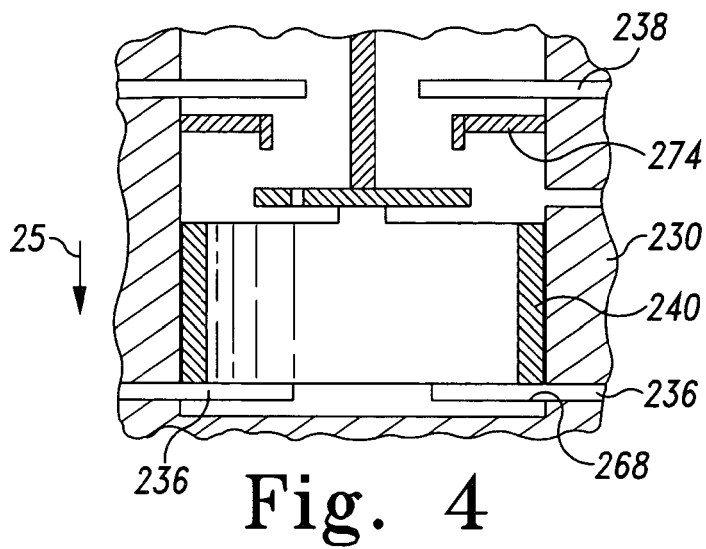
FIG. 4 is a sectional view taken through the center of an alternative liner and valve member, the second seat positioned between the hot liner inlet and the cold liner inlet.
Figure 5:
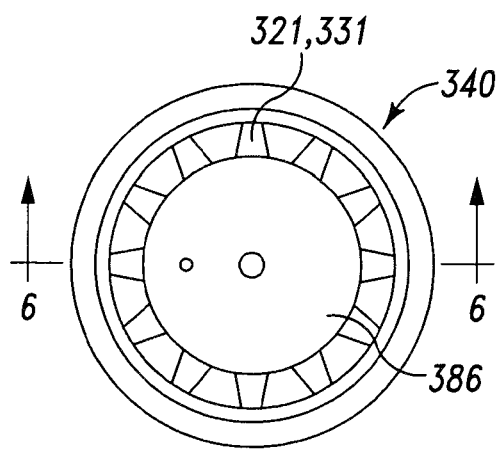
FIG. 5 is a top view of an alternative valve member having mixing fins extending radially outwardly from the valve member.
Figure 7:
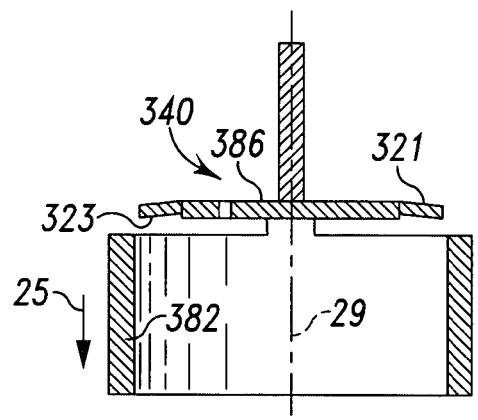
FIG. 7 is a sectional view through the center of a valve member similar to that of FIG. 6, the mixing fins including a surface facing radially inwardly and in an upstream direction.
Figure 6:
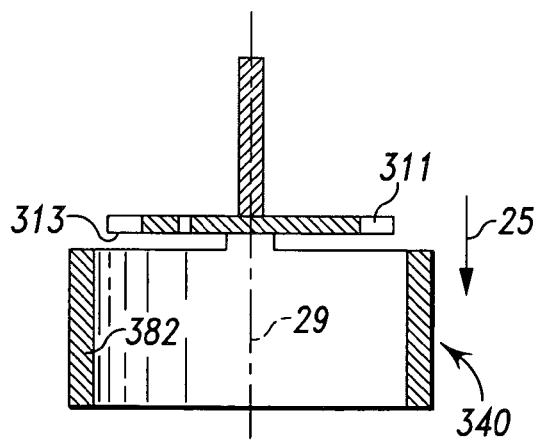
FIG. 6 is a sectional view taken generally along section line 6-6 of FIG. 5, through the center of a valve member showing mixing fins extending from a disc at a downstream end of the valve member, the mixing fins including a surface generally perpendicular to an axis through the liner.

Referring now to FIG. 4, an alternative liner 230 is shown. Liner 230 is formed to include a cold liner inlet 238 downstream of second seat 274. In this arrangement, valve member 240 shown in FIG. 4 cooperates with liner 230, specifically first and second seats 268, 274 and sides of liner 230 adjacent hot liner inlet 236 to restrict hot fluid flow past valve member 240. Flow of cold fluid through cold liner inlet 238 is not directly restricted by movement of valve member 240. Cold liner inlet 238 allows cold fluid to be provided regardless of failure of thermostat or hot fluid supply.

Referring now to FIGS. 5-8, a valve member 340 is shown including mixing fins to increase turbulence and encourage mixing of fluids. As shown in FIGS. 5-8, valve member 340 includes a plurality of mixing fins. Different shapes of mixing fins 311, 321, and 331 are shown associated with valve member 340 in FIGS. 6, 7, and 8 respectively. Each of fins 311, 321, and 331 extends radially outwardly from disc 386. Fins 311 of FIG. 6 have lower surfaces 313 that are generally perpendicular to central axis 29. Fins 321 of FIG. 7 have lower surfaces 323 that face radially inwardly and in upstream direction 25, toward cylindrical portion 382 of valve member 340.

Figure 8:
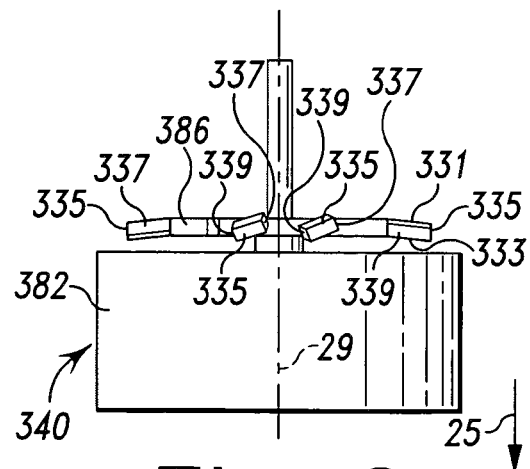
FIG. 8 is a front view of a valve member similar to that of FIG. 6, the mixing fins including a surface that is slanted.

Fins 331 of FIG. 8 have lower surfaces 333 that face substantially upstream toward cylindrical portion 382 of valve member 340. Lower surfaces 333 of fins 331 are on a slant so that, when viewed looking toward a front 335 of one of fins 331, an upstream edge of first side 337 is oriented downstream of an upstream edge of an opposite second side 339 to form the slant. It is thought that such a slant could cause valve member 340 to spin with sufficient flow of hot and/or cold fluid flowing past fins 331. Mixing fins 311, 321, 331 are illustratively formed integral with disc 386, and investment casting is one manufacturing technique contemplated to form disc 386 and fins 311, 321, 331.

Figure 9:
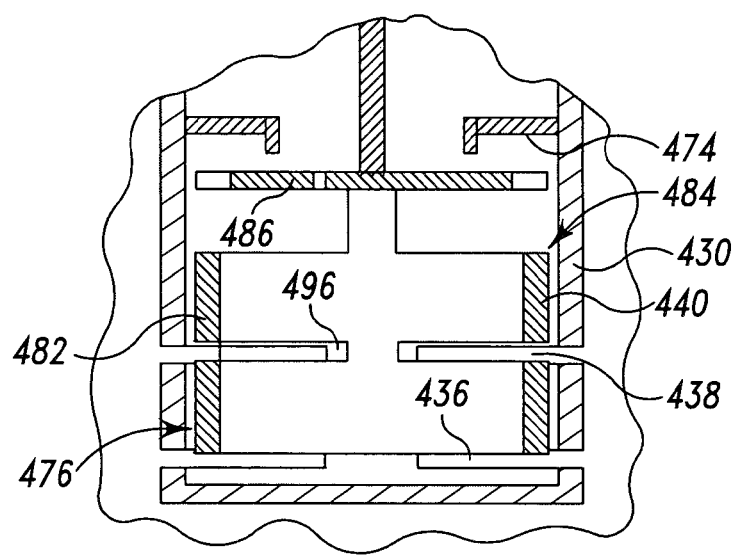
FIG. 9 is a sectional view through the center of an alternative liner and valve member, the cold liner inlet being between the second seat and the hot liner inlet, and the valve member including a cold inlet slot, the cold liner inlet being closer to the hot liner inlet than the second seat.

Referring now to FIG. 9, liner 430 is configured to encourage earlier mixing of hot and cold fluids in a mixing valve. Liner 430 includes hot and cold liner inlets 436, 438 upstream of second seat 474. Slots 496 in the side of valve member 440 align with cold liner inlet 438 to permit flow of cold fluid past valve member 440. Cold liner inlet 438 of liner 430 is positioned closer to hot liner inlet 436 than to second seat 474. Slots 496 in valve member 440 are positioned closer to upstream end 476 than to either downstream end 484 of cylindrical portion 482 or disc 486.

Figure 10:
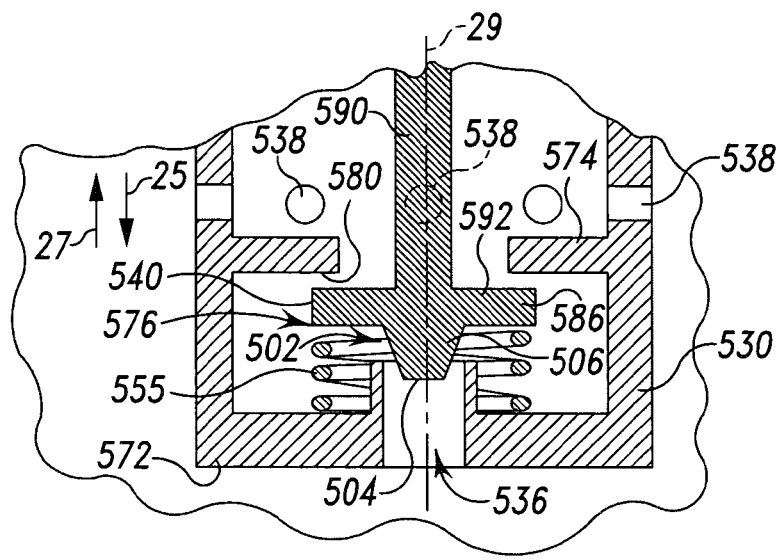
FIG. 10 is a sectional view through the center of an alternative liner and valve member, the hot liner inlet being a bore in the floor of the liner, the second seat being between the cold liner inlet and the bore, and the valve member being a poppet movable between a first position engaging the first seat to close the bore and a second position engaging the second seat, the valve member including a centering portion.

Referring now to FIG. 10, liner 530 is configured so that hot liner inlet 536 is a bore formed in floor 572 thereof. First seat 568 projects as a wall up from floor 572 to border the bore. Cold liner inlet 538 is positioned in liner 530 downstream of the second seat 574, and is shown as a plurality of holes provided in the sides of liner 530. Second seat 574 is illustratively an annular flange extending radially inwardly toward central axis 29. Seating surface 580 of second seat 574 is provided on a surface of seat 574 that faces upstream.

Valve member 540 is a "poppet" style valve member. Valve member 540 includes disc 586, a centering portion 502 extending from an upstream end 576 of disc 586, and a connection member 590 extending from engagement surface 592 of disc 586. Connection member 590 extends beyond second seat 574 to engage an actuator (not shown). During thermostat failure, first spring 555 biases valve member 540 such that engagement surface 592 of valve member 540 engages seating surface 580 of second seat 574, and these two surfaces engage to restrict the flow of hot fluid. In normal operation, when the mixed fluid temperature increases, the thermostat assembly moves valve member 540 in upstream direction 25 toward a first position in which upstream end 576 of disc 586 engages first seat 568, closing hot liner inlet 536.

Figure 11:
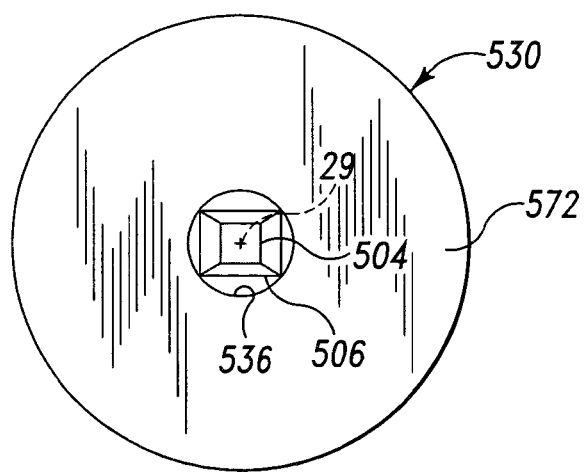
FIG. 11 illustrates a bottom view of the liner and valve member of FIG. 10 showing the floor of the liner and the centering portion of the valve member in the bore.

As shown in FIGS. 10 and 11, centering portion 502 of valve member 540 is illustratively a frustum of a right rectangular pyramid; the upstream end 504 of centering portion 502 has an area less than the area of the downstream end 506 connected to disc 586. Illustratively, as shown in FIG. 11, both of the ends 504, 506 of centering portion 502 fit in hot liner inlet 536 so that upstream end 576 can engage first seat 568. The smaller upstream end 504 and the pyramidal shape of centering portion 502 assist with centering disc 586 so that the hot liner inlet 536 can be closed. Although shown as a pyramid, other shapes would also properly orient disc 586 as disc 586 moves toward engagement with first seat 568. Such shapes may include, but are not limited to, conical shapes, frustoconical shapes, paraboloidal shapes, or the like.

Figure 12:
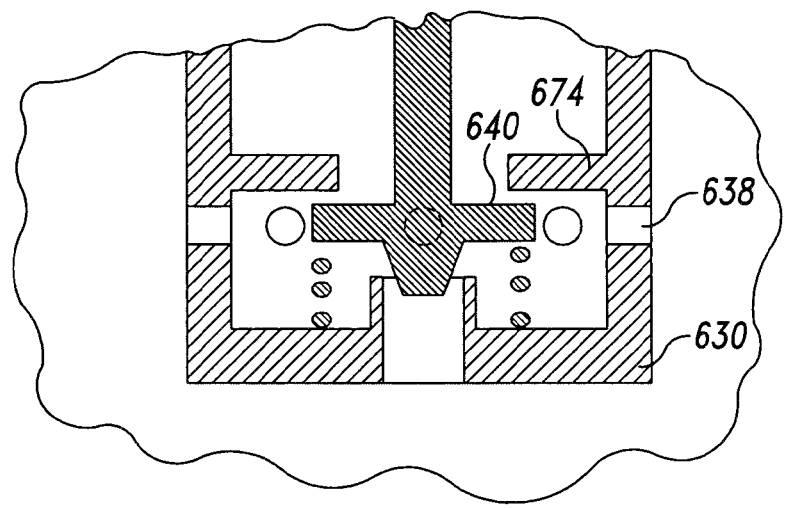
FIG. 12 illustrates a sectional view similar to FIG. 10 of an alternative liner with the cold liner inlet being between the hot liner inlet and the second seat.

As shown in FIG. 12, liner 630 is modified from liner 530 of FIG. 10 by moving the second seat 674 downstream of the cold liner inlet 638. Upon failure of the thermostat, this arrangement restricts flow of both hot and cold fluid. During normal operation, valve member 640 throttles the flow of hot fluid to control the temperature of the mixed fluid.

Referring now to FIG. 13, liner 730 is similar to liner 530 of FIG. 10. Liner 730 includes a cold liner inlet 738 downstream of second seat 774. Connection member 790 is coupled to an upper piston 781 that moves in liner 730 adjacent cold liner inlet 738. Instead of permitting unrestricted flow of cold fluid as with certain previously described liners, upper piston 781 throttles the flow of cold fluid during its movement in liner 730.

Upper piston 781 is generally cylindrical in shape and has an upstream end 783 and a downstream end 785. Upstream end 785 includes inlet ports 787 to permit flow of hot fluid from the hot liner inlet 736 through upper piston 781. A central opening 789 is formed in upstream end 783 and receives connection member 790 therein. A flange 791 is coupled to connection member 790 and provides an engagement surface 793 which contacts upstream end 783 so that upper piston 781 and valve member 740 move together. Sides 795 of the generally cylindrical upper piston 781 are formed to include cold inlet holes 797 so that when sides 795 otherwise cover cold liner inlet 738, flow of cold fluid enters through cold inlet holes 797.

Cold liner inlet 738 is illustratively somewhat oversized compared with other cold liner inlets previously disclosed herein. In axial length, cold liner inlet has a length L2 that approximates the axial length L1 of upper piston 781. As such, when valve member 740 is seated against first seat 768, cold fluid flows through cold inlet holes 797 and between downstream end 785 and the downstream end of liner 730. When valve member 740 is seated against second seat 774, cold fluid flows through cold inlet holes 797 and inlet ports 787 in upstream end 785 of upper piston 781. Thus, valve member 740 permits flow of cold fluid from cold liner inlet 738 regardless of the position Of upper piston 781.

Figure 14:
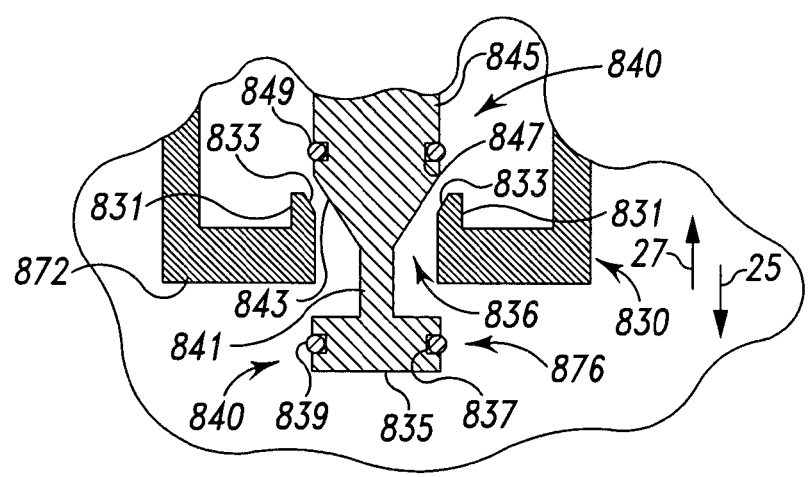
FIG. 14 illustrates a sectional view through the center of an alternative liner and valve member, the liner including a first seat adjacent a hot liner inlet formed as a bore, a cold liner inlet, and a second seat between the hot and cold liner inlets, the valve member being a poppet and including an upper piston to throttle the flow of cold fluid, the poppet movable between a position engaging the first seat and a position engaging the second seat.

Referring now to FIG. 14, liner 830 is configured so that hot liner inlet 836 is a bore formed in floor 872 thereof. A wall 831 projects upstream from floor 872 to border the bore. Wall 831 includes an interior edge 833 that is illustratively beveled. Upstream end 876 of valve member 840 is a disc-shaped structure 835 and includes a groove 837 around the outside thereof to receive a first o-ring 839. A connection member 841 extends from the disc-shaped structure 835 to a frustoconical region 843, which is connected to a generally cylindrical downstream region 845 of valve member 840. Downstream region 845 is formed to include a groove 847 to receive a second o-ring 849 therein.

In operation, as the thermostat moves valve member 840 to close hot liner inlet 836, frustoconical region 843 cooperates with beveled interior edge 833 to center second o-ring 849 with hot liner inlet bore 836 as second o-ring 849 approaches the bore. Second o-ring 849 seats against the axially inwardly-facing walls that define hot liner inlet 836 to restrict flow of hot fluid therethrough. Upon failure of the thermostat, a spring (not shown) biases valve member 840 in a downstream direction 27 to a position wherein disc-shaped structure 835 is in hot liner inlet bore 836, and first o-ring 839 seats against the axially inwardly-facing walls that define hot liner inlet 836 to restrict flow of hot fluid therethrough. Because first and second o-rings 839, 849 seat against the inwardly facing wall of the bore, assembly is simplified as valve member 840 can be simply "dropped in" liner 830.

It should be understood that some of the valve members—as drawn in FIGS. 3A-9—are not drawn in proportion relative to the liners, but rather the sides of the valve members are drawn spaced apart from the inner walls of the liners to facilitate discussion. In practice, as would be appreciated by one of ordinary skill in the art, the diameter of the valve members is only slightly less than the diameter of the bores through the liners so that the valve members can move in the liners and provide the necessary degree of closure of the liner inlet(s). As would be understood by one of ordinary skill in the art, it is within the scope of this disclosure to provide first and second seats in a liner that is a separate component coupled to the valve body or as part of the valve body that serves as a liner. Although various openings to the liners and the valve members disclosed herein are shown as slots or holes, it should be understood that other suitable shapes and sizes are within the scope of this disclosure. As used herein, the terms "upstream" and "downstream" are used in the sense relative to the direction of the flow of hot fluid through the cavity of the valve body during normal operation of the mixing valve. Although specific features may be shown in association with particular structure disclosed in certain embodiments, it should be understood that some of these features can be included in other embodiments, and the inclusion of these specific features with only some of the embodiments should not be considered as limiting.

Although a mixing valve has been described in detail with reference to certain preferred embodiments, variations and modifications exist within the scope and spirit of the invention as described and defined in the following claims.

The invention claimed is:

1. A mixing valve comprising:
   a valve body including a hot fluid inlet and a cold fluid inlet and an outlet, and defining a cavity between the inlets and the outlet,
   a liner disposed in the cavity, the liner including a hot liner inlet in fluid communication with the hot fluid inlet, and a cold liner inlet in fluid communication with the cold fluid inlet, and
   a movable valve member disposed at least partially in the liner and movable between a first position to block the flow of fluid through the hot liner inlet and a second position to restrict flow of fluid from the hot liner inlet and cold liner inlet, the valve member including a weep opening to permit restricted flow of fluid therethrough when the valve member is in the second position.

2. The mixing valve of claim 1, wherein the liner includes an upstream valve seat, and the valve member engages the upstream valve seat when the valve member is in the first position.

3. The mixing valve of claim 1, further comprising a thermostat coupled to the valve member to move the valve member in response to changing temperature of mixed fluid, wherein upon failure of the thermostat, the valve member moves to the second position.

4. The mixing valve of claim 1, wherein the valve member includes a cylindrical portion having an upstream end and a downstream end, the upstream end engaging the first seat.

5. The mixing valve of claim 1, wherein the valve member further includes a disc coupled to the downstream end of the cylindrical portion, the disc engaging a downstream valve seat when the valve member is in the second position.

6. The mixing valve of claim 1, wherein the hot liner inlet is a slot formed in a side of the liner.

7. The mixing valve of claim 1, wherein the hot liner inlet is a bore formed in the floor.

8. The mixing valve of claim 1, which further comprises a downstream valve seat having an annular flange coupled to and extending radially inwardly from the liner.

* * * * *

UNITED STATES PATENT AND TRADEMARK OFFICE
CERTIFICATE OF CORRECTION

PATENT NO.      : 9,081,392 B2
APPLICATION NO. : 14/040115
DATED           : July 14, 2015
INVENTOR(S)     : Kevin B. Kline Page 1 of 1

It is certified that error appears in the above-identified patent and that said Letters Patent is hereby corrected as shown below:

In the claims

In Claim 26 (column 8, line 42), "claim 1" should be changed to --claim 4--.

In Claim 27 (column 8, line 46), "claim 1" should be changed to --claim 4--.

Signed and Sealed this
First Day of December, 2015

Michelle K. Lee
*Director of the United States Patent and Trademark Office*